United States Patent
Biskupski et al.

(10) Patent No.: US 8,777,110 B2
(45) Date of Patent: Jul. 15, 2014

(54) MULTI-PACK GIFT CARD AND ACTIVATION THEREOF

(75) Inventors: Ted Biskupski, Cupertino, CA (US); Philip J. Luongo, Jr., San Francisco, CA (US); Judith Brill, San Francisco, CA (US); Laura Maria Vignale, New York, NY (US)

(73) Assignee: Apple Inc., Cupertino, CA (US)

( * ) Notice: Subject to any disclaimer, the term of this patent is extended or adjusted under 35 U.S.C. 154(b) by 523 days.

(21) Appl. No.: 12/041,536

(22) Filed: Mar. 3, 2008

(65) Prior Publication Data

US 2009/0218408 A1 Sep. 3, 2009

(51) Int. Cl.
*G06K 7/00* (2006.01)
*G06K 19/00* (2006.01)
*B65D 85/48* (2006.01)
*B65D 85/00* (2006.01)
*B65D 73/00* (2006.01)

(52) U.S. Cl.
USPC ........ 235/486; 235/487; 206/449; 206/459.5; 206/470; 206/471

(58) Field of Classification Search
USPC ......... 235/486, 487, 492–494, 379, 380, 383; 206/39, 459.5, 460–471, 495, 449, 206/307, 307.1, 308.1, 308.2, 312, 303, 206/308.3, 349, 493, 564, 565, 703, 206/769–774, 775–783; 211/72, 55; 229/92.8, 87.06, 71; D3/247; D9/414, D9/415, 433, 457, 420, 424–432; D19/9, D19/10; D20/43; 150/147–149; D6/407, D6/630, 631, 634; 220/500–557, 220/23.83–23.91; 55/467, 468, 473, 475
See application file for complete search history.

(56) References Cited

U.S. PATENT DOCUMENTS

| | | | |
|---|---|---|---|
| 846,064 A | 3/1907 | Souder | |
| 3,346,294 A | 10/1967 | Sartz | |
| 4,319,684 A * | 3/1982 | Backman et al. | 206/464 |
| 4,828,105 A | 5/1989 | Silengo et al. | |
| 5,036,645 A * | 8/1991 | Schwarz | 53/412 |
| 5,135,157 A | 8/1992 | Cruz | |
| 5,139,454 A | 8/1992 | Earnest | |

(Continued)

FOREIGN PATENT DOCUMENTS

| | | |
|---|---|---|
| EP | 0725376 | 8/1996 |
| EP | 0927945 | 7/1999 |

(Continued)

OTHER PUBLICATIONS

"Identification Cards—Recording Technique—Part 7: Magnetic Strip—High Coercivity, High Density", ISO Standard, ISO/IEC 7811-7:2004 downloaded Dec. 26, 2007, 2 pgs.

(Continued)

*Primary Examiner* — Michael G Lee
*Assistant Examiner* — Suezu Ellis

(57) ABSTRACT

Methods and apparatus for providing multiple transaction cards in a single package are described. According to one aspect, a carrier package arrangement includes a holder and a plurality of transaction cards. The transaction cards are retained on the holder, and are arranged to be transitioned form an unactivated state to an activated state using a first activation code. The carrier package arrangement can also include a case that can contain the holder and the plurality of transaction cards.

22 Claims, 17 Drawing Sheets

(56) References Cited

U.S. PATENT DOCUMENTS

| | | | |
|---|---|---|---|
| 5,143,279 A | 9/1992 | Gaines | |
| 5,219,184 A | 6/1993 | Wolf | |
| 5,263,586 A | 11/1993 | Keable | |
| D344,757 S | 3/1994 | Kruyt | |
| 5,467,917 A | 11/1995 | Potter | |
| 5,516,033 A | 5/1996 | Bernetich | |
| 5,573,117 A * | 11/1996 | Adams | 206/449 |
| 5,575,384 A | 11/1996 | Saye | |
| 5,626,551 A | 5/1997 | Kearns et al. | |
| 5,641,115 A | 6/1997 | Brewster | |
| 5,645,214 A | 7/1997 | Taganas | |
| 5,650,209 A | 7/1997 | Ramsburg et al. | |
| 5,687,992 A | 11/1997 | Finkelshteyn | |
| 5,755,375 A | 5/1998 | Rogers | |
| 5,760,381 A | 6/1998 | Stitch et al. | |
| 5,791,474 A | 8/1998 | Hansen | |
| D400,919 S | 11/1998 | Pickel | |
| 5,842,629 A | 12/1998 | Sprague et al. | |
| 5,845,425 A | 12/1998 | Leake et al. | |
| 5,862,979 A | 1/1999 | Hill et al. | |
| 5,906,063 A | 5/1999 | Magee, Sr. | |
| 5,918,909 A * | 7/1999 | Fiala et al. | 283/61 |
| 5,941,573 A | 8/1999 | Yordinsky | |
| 5,946,834 A | 9/1999 | Bradley | |
| 5,947,283 A * | 9/1999 | Marshall | 206/320 |
| 5,963,915 A | 10/1999 | Kirsch | |
| 5,963,916 A | 10/1999 | Kaplan | |
| 5,981,040 A | 11/1999 | Rich et al. | |
| 5,984,091 A | 11/1999 | Orr et al. | |
| 6,003,254 A | 12/1999 | Lorber | |
| 6,050,415 A * | 4/2000 | Lind et al. | 206/462 |
| 6,053,321 A | 4/2000 | Kayser | |
| 6,070,719 A | 6/2000 | Pollock | |
| 6,092,841 A | 7/2000 | Best et al. | |
| 6,199,912 B1 | 3/2001 | Finkelshteyn | |
| 6,224,108 B1 * | 5/2001 | Klure | 283/74 |
| 6,233,682 B1 | 5/2001 | Fritsch | |
| 6,244,444 B1 * | 6/2001 | Jacobus et al. | 206/703 |
| D447,055 S | 8/2001 | Several et al. | |
| 6,270,012 B1 * | 8/2001 | Dawson | 235/381 |
| 6,299,530 B1 | 10/2001 | Hansted et al. | |
| 6,349,829 B1 | 2/2002 | Matheis et al. | |
| D457,555 S | 5/2002 | Stephens-D'Angelo et al. | |
| 6,385,596 B1 | 5/2002 | Ansell et al. | |
| 6,418,648 B1 | 7/2002 | Hollingsworth et al. | |
| 6,457,638 B1 | 10/2002 | Schmidt | |
| 6,491,213 B2 | 12/2002 | Purcell | |
| 6,588,596 B1 * | 7/2003 | Holmes et al. | 206/778 |
| 6,619,480 B2 | 9/2003 | Smith | |
| 6,659,271 B2 | 12/2003 | Parsons | |
| 6,698,116 B2 | 3/2004 | Waldron | |
| 6,731,312 B2 | 5/2004 | Robbin | |
| 6,957,737 B1 * | 10/2005 | Frederickson et al. | 206/449 |
| D512,456 S | 12/2005 | Diaz et al. | |
| 7,040,049 B2 * | 5/2006 | Cox et al. | 40/124.191 |
| 7,055,740 B1 | 6/2006 | Schultz et al. | |
| D541,647 S | 5/2007 | Ashby et al. | |
| 7,243,839 B2 | 7/2007 | Beck et al. | |
| D548,279 S | 8/2007 | Gulakos | |
| 7,277,870 B2 | 10/2007 | Mourad et al. | |
| 7,278,584 B1 | 10/2007 | Gandel et al. | |
| 7,322,519 B2 | 1/2008 | Blank et al. | |
| 7,367,504 B2 * | 5/2008 | Lewis et al. | 235/449 |
| 7,374,095 B2 | 5/2008 | Blank et al. | |
| 7,409,788 B2 | 8/2008 | Lauer et al. | |
| 7,490,720 B2 | 2/2009 | Cole et al. | |
| 7,500,604 B2 | 3/2009 | Holme | |
| 7,546,288 B2 | 6/2009 | Springer et al. | |
| 7,584,887 B1 | 9/2009 | Sanchez et al. | |
| 7,607,574 B2 | 10/2009 | Kingsborough et al. | |
| 7,712,741 B2 | 5/2010 | Lambert | |
| 7,740,170 B2 * | 6/2010 | Singh et al. | 235/380 |
| 7,822,640 B2 | 10/2010 | Arthur et al. | |
| 7,837,125 B2 | 11/2010 | Biskupski et al. | |
| 7,896,252 B2 | 3/2011 | Narlinger et al. | |
| 8,256,682 B2 | 9/2012 | Chakiris et al. | |
| D682,711 S * | 5/2013 | Rider et al. | D9/715 |
| 8,640,949 B2 * | 2/2014 | Biskupski et al. | 235/380 |
| 2001/0034703 A1 | 10/2001 | Picciallo et al. | |
| 2001/0040115 A1 * | 11/2001 | Wani et al. | 206/705 |
| 2001/0045738 A1 | 11/2001 | Klure | |
| 2002/0002468 A1 | 1/2002 | Geisler et al. | |
| 2002/0028321 A1 | 3/2002 | Feilen et al. | |
| 2002/0080714 A1 | 6/2002 | Pierson et al. | |
| 2002/0088855 A1 * | 7/2002 | Hodes | 235/385 |
| 2002/0147683 A1 | 10/2002 | Capobianco et al. | |
| 2002/0157974 A1 | 10/2002 | Krahn | |
| 2002/0195816 A1 | 12/2002 | Anise | |
| 2003/0004889 A1 * | 1/2003 | Fiala et al. | 705/64 |
| 2003/0018586 A1 | 1/2003 | Krahn | |
| 2003/0066777 A1 | 4/2003 | Malone | |
| 2003/0150142 A1 | 8/2003 | Street | |
| 2003/0156686 A1 | 8/2003 | Pines | |
| 2003/0230501 A1 | 12/2003 | Smolev | |
| 2004/0064374 A1 | 4/2004 | Cho | |
| 2004/0140361 A1 | 7/2004 | Paul et al. | |
| 2004/0140616 A1 | 7/2004 | Davis | |
| 2004/0254836 A1 | 12/2004 | Barabas et al. | |
| 2004/0267622 A1 | 12/2004 | Taylor et al. | |
| 2004/0268386 A1 | 12/2004 | Logan et al. | |
| 2005/0017502 A1 | 1/2005 | Chariker | |
| 2005/0100312 A1 | 5/2005 | Commons et al. | |
| 2005/0167301 A1 | 8/2005 | Oram | |
| 2005/0167910 A1 | 8/2005 | Candler et al. | |
| 2005/0171795 A1 | 8/2005 | Kearby et al. | |
| 2005/0182675 A1 | 8/2005 | Huettner | |
| 2005/0279825 A1 | 12/2005 | Ashby et al. | |
| 2006/0032764 A1 | 2/2006 | Swenson | |
| 2006/0042986 A1 * | 3/2006 | Simkowski | 206/470 |
| 2006/0065748 A1 | 3/2006 | Halbur et al. | |
| 2006/0086630 A1 | 4/2006 | Cheong et al. | |
| 2006/0118618 A1 | 6/2006 | Schultz et al. | |
| 2006/0185201 A1 | 8/2006 | Fachon et al. | |
| 2006/0212401 A1 | 9/2006 | Ameerally et al. | |
| 2006/0224516 A1 | 10/2006 | Lemon et al. | |
| 2006/0235864 A1 | 10/2006 | Hotelling et al. | |
| 2006/0243609 A1 | 11/2006 | Cole et al. | |
| 2006/0259189 A1 | 11/2006 | Perlow et al. | |
| 2006/0261154 A1 * | 11/2006 | Arthur et al. | 235/380 |
| 2007/0017973 A1 | 1/2007 | Blank et al. | |
| 2007/0038577 A1 | 2/2007 | Werner et al. | |
| 2007/0063052 A1 * | 3/2007 | Chakiris et al. | 235/486 |
| 2007/0090184 A1 | 4/2007 | Lockwood et al. | |
| 2007/0154167 A1 | 7/2007 | Ando et al. | |
| 2007/0174200 A1 | 7/2007 | Sung-Min et al. | |
| 2007/0187492 A1 | 8/2007 | Graves et al. | |
| 2007/0198418 A1 | 8/2007 | Macdonald et al. | |
| 2007/0208664 A1 | 9/2007 | Ortega | |
| 2007/0224969 A1 | 9/2007 | Rao | |
| 2007/0267502 A1 | 11/2007 | Zellner et al. | |
| 2007/0278280 A1 | 12/2007 | Wert et al. | |
| 2007/0289890 A1 * | 12/2007 | Appelbaum | 206/461 |
| 2008/0052371 A1 | 2/2008 | Partovi et al. | |
| 2008/0116088 A1 | 5/2008 | Roberts | |
| 2008/0116089 A1 | 5/2008 | Roberts | |
| 2008/0120609 A1 | 5/2008 | Gates et al. | |
| 2008/0154722 A1 | 6/2008 | Galinos | |
| 2008/0159715 A1 | 7/2008 | Fuasaro et al. | |
| 2008/0188209 A1 | 8/2008 | Dorogusker et al. | |
| 2008/0190267 A1 | 8/2008 | Rechsteiner et al. | |
| 2008/0320139 A1 | 12/2008 | Fukuda et al. | |
| 2009/0063292 A1 * | 3/2009 | Cole et al. | 705/26 |
| 2009/0104539 A1 | 4/2009 | Watanabe et al. | |
| 2009/0218392 A1 * | 9/2009 | Biskupski et al. | 235/375 |
| 2009/0283594 A1 * | 11/2009 | Walton et al. | 235/383 |
| 2010/0219099 A1 * | 9/2010 | Schmitt et al. | 206/776 |
| 2010/0253063 A1 | 10/2010 | Skogster | |
| 2011/0137793 A1 | 6/2011 | Liggett | |
| 2012/0025516 A1 | 2/2012 | Miller et al. | |
| 2012/0234909 A1 * | 9/2012 | Tang | 235/375 |
| 2012/0256006 A1 | 10/2012 | Schmitt | 235/493 |
| 2012/0259718 A1 * | 10/2012 | Miller et al. | 705/17 |

(56) References Cited

U.S. PATENT DOCUMENTS

FOREIGN PATENT DOCUMENTS

| | | |
|---|---|---|
| EP | 1111562 | 6/2001 |
| FR | 2827981 | 1/2003 |
| WO | WO99/24942 A | 5/1999 |
| WO | WO00/28461 | 5/2000 |
| WO | WO00/43852 | 7/2000 |
| WO | WO00/62265 | 10/2000 |
| WO | WO01/41023 | 6/2001 |
| WO | WO01/44908 | 6/2001 |
| WO | WO01/46786 | 6/2001 |
| WO | WO01/50305 | 7/2001 |
| WO | WO02/08869 | 1/2002 |
| WO | 2004/038567 A | 5/2004 |
| WO | 2004/044770 A | 5/2004 |

OTHER PUBLICATIONS

"American National Standard Specifications for Credit Cards", American National Standards Institute, Inc. (ANSI), x4.13/1971, 1971, 18 pgs.

"American National Standard Magnetic-Stripe Encoding for Credit cards", American National Standards Institute, Inc. (ANSI), x4.16/1976, 1976, 12 pgs.

Offenberg, J. "Markets—Gift Cards", Journal of Economic Perspectives, vol. 21, No. 2, Spring 2007, pp. 227-238.

U.S. Appl. No. 11/965,674, entitled "Methods and Systems for Encoding a Magnetic Stripe", filed Dec. 27, 2007.

U.S. Appl. No. 12/197,975, entitled "Carrier Card Arrangement with Removable Envelope", filed Aug. 25, 2008.

U.S. Appl. No. 12/262,097, entitled "Method for Assembling and Activating a Multi-Pack Package of Transaction Cards", filed Oct. 30, 2008.

"Identification Cards-Recording Technique", International Standard ISO/IEC, vol. 7811-2, No. Third Edition, Feb. 1, 2001, pp. 1-21.

Pottery Barn, Gift Cards, Web Page, downloaded Jun. 27, 2008, 1 pg.

"List." Dictionary of Publishing and Printing. London: A&C Black, 2006, www.credoreference.com/entry/acbpublishing/list, p. 1.

"Listing." Collins English Dictionary. London: Collins, 2000, www.credoreference.com/entry/hcengdict/listing, p. 1.

"Bin." Collins English Dictonary, London: Collins, 2000, www.credoreference.com/entry/hcengdict/bin, p. 1.

"Rack 1",Collins English Dictonary, London, Collins 2000, www.credoreference.com/entry/hcengdict.rack_1, 1 pg.

"Price", Chambers 21st Centruy Dictonary, London, Chambers Harrap, 2001, www.credoreference.com/entry/chambdict/price, 1 pg.

"Allow", Webster's Third New International Dictionary, Merriam-Webster, downloaded Jul. 14, 2009, http://lionreference.chadwyck.com/searchFulltext.do?id=871261&idType=offset&divLevel=2&queryId=../sessions/1247680262_19043&area=mwd&forward=refshelf&trail=refshelf, 2 pg.

"Value", Webster's Third New International disconary, Merriam-Webster, Incorporated, downloaded Jul. 15, 2009, http://lionreference.chadwyck.com/searchFulltext.do?id=38664807&idTyple=offset&divLevel=2&queryID=../session/1247683362_2487&area=mwd&forward=refshelf&trail=refshelf, p. 4.

"Media", Chambers 21st Century Dictonary, London, Chambers Harrap, 2001, downloaded Jul. 15, 2009, www.credoreference.com/entry/chambdict/media.com, 1 pg.

"Associate", Collins English Dictionary, London, Collins 2000, www.credoreference.com/entry/hcengdict/associate, 1 pg.

"Active", Webster's Third New International Dictionary, Merriam-Webster, Inc., downloaded Jul. 16, 2009, http://lionreference.chadwyck.com/searchFulltext.do?id=313560&idType=offset&divLevel=2&queryID=../session/1247778592_27918&area=mwd&forward=refshelf&trail=refshelf, 3 pg.

"Activate", Webster's Third New International Dictionary, Merriam-Webster, Inc., downloaded Jul. 16, 2009, http://lionreference.chadwyck.com/searchFulltext.do?id=312239&idType=offset&divLevel=2&queryID=../session/1247778879_29216&area=mwd&forward=refshelf&trail=refshelf, 2 pg.

The Bank Credit Card Business, 2nd Edition, American Bankers Association, Washington D.C., 1996, pp. 1-13, 63-89.

Smart Card Handbook, 2nd Edition, W. Rankl and W. Effing, John Wiley and Sons, West Sussex, England, 2000, 49 pgs.

\* cited by examiner

MULTI-PACK GIFT CARD AND ACTIVATION THEREOF

BACKGROUND OF THE INVENTION

1. Field of the Invention

The present invention relates to transaction cards and, more particularly, to providing multiple monetary transaction cards in a single package and facilitating substantially simultaneous activation of the multiple monetary transaction cards.

2. Description of the Related Art

Monetary transaction cards generally include smart cards, credit cards, debit cards, automatic teller machine (ATM) cards, identification (ID) cards, and pre-paid cards such as gift cards. Typically, monetary transaction cards are of a standard credit card size, or a the size of a CR-80 card. FIG. 1 is a diagrammatic representation of a standard CR-80 card. A CR-80 card 100 generally includes a magnetic stripe 108, and has a height H 112 that is approximately 2.125 inches and a width W 116 that is approximately 3.375 inches. A distance D1 120 between magnetic stripe 108 and an edge 104 of CR-80 card 100 is approximately 0.223 inches. In general, a thickness D2 124 of magnetic stripe 108 may vary depending upon the number of tracks (not shown) associated with magnetic stripe 108. Typically, if two tracks (not shown) are encoded on magnetic stripe 108, thickness D2 124 may be approximately 0.375 inches. Alternatively, if three tracks (not shown) are encoded on magnetic stripe 108, thickness D2 124 may be approximately 0.5 inches.

Monetary transaction cards that are gift cards or other pre-paid cards are often attached to carrier cards, and displayed at retail locations. FIG. 2 is a diagrammatic representation of a transaction card mounted on a carrier card. A carrier assembly 236 includes a transaction card 200 and a carrier card 240. Transaction card 200 is often mounted on carrier card 240 using an adhesive. Carrier card 240 may include an opening 244 that enables carrier card 240 to be hung on a rack for display purposes.

When an individual wishes to purchase or otherwise obtain multiple transaction cards such as pre-paid cards, he or she selects individual transaction cards which are then individually activated, e.g., using a point-of-sale computing system. The individual activation of the transaction cards may be time consuming, as information is read from each transaction card, and transmitted to an activation system. If there are many transaction cards to be activated, activating the transaction cards one-by-one may be inefficient.

Therefore, what is needed is a method and an apparatus for providing and facilitating activation of multiple transaction cards such as pre-paid cards.

SUMMARY OF THE INVENTION

The present invention pertains to providing and facilitating activation of multiple transaction cards (e.g., pre-paid cards). The present invention may be implemented in numerous ways, including, but not limited to, as a method, system, device, or apparatus (including computer program code). Example embodiments of the present invention are discussed below.

According to one aspect of the present invention, a carrier package arrangement includes a holder and a plurality of transaction cards. The transaction cards are mounted on or otherwise retained to the holder, and are arranged to be transitioned form an unactivated state to an activated state using a first activation code. In one embodiment, the first activation code is provided on the holder. In one embodiment, the carrier package arrangement can also include a case that can contain the holder and the plurality of transaction cards.

According to another aspect of the present invention, a method for forming a carrier package arrangement includes obtaining a carrier card and obtaining a plurality of transaction cards. The transaction cards are configured to be activated using a shared activation code. The method also includes providing the shared activation code on the carrier card, and retaining the plurality of transaction cards on or relative to the carrier card.

According to another aspect of the present invention, a package includes at least two transaction cards and a carrier card. A first transaction card and a second transaction card are configured to be activated by a first authentication arrangement. The first and second transaction cards are retained to the carrier card. The second transaction card is arranged to at least partially overlap the first transaction card.

In accordance with yet another aspect of the present invention, a package includes two or more transaction cards, a carrier card, and a case. A first transaction card and a second transaction card are configured to be activated by a first authentication arrangement. The first and second transaction cards are attached to the carrier card. The case is shaped to accommodate the transaction cards and the carrier card, and is configured to be closed over the transaction cards and the carrier card.

Other aspects and advantages of the invention will become apparent from the following detailed description taken in conjunction with the accompanying drawings which illustrate, by way of example, the principles of the invention.

BRIEF DESCRIPTION OF THE DRAWINGS

The invention will be readily understood by the following detailed description in conjunction with the accompanying drawings, in which.

DETAILED DESCRIPTION OF THE INVENTION

Example embodiments of the present invention are discussed below with reference to the various figures. However, those skilled in the art will readily appreciate that the detailed description given herein with respect to these figures is for explanatory purposes, as the invention extends beyond these embodiments.

Providing multiple transaction cards, e.g., pre-paid cards such as gift cards, in a single package such that the transaction cards may substantially all be activated at one time increases the efficiency with which separate gift cards may be activated. By way of example, a package that contains multiple gift cards may be arranged such that a single activation code associated with the package may be used to activate all of the gift cards at the same time. When information relating to the single activation code is provided to an authentication and authorization system, the authentication and authorization system may cause all of the gift cards included in the package to be activated.

In one embodiment, a multi-pack package of transaction cards may include multiple transaction cards that are retained on a carrier card or a holder. The carrier card and the multiple transaction cards may effectively form a carrier assembly which may then be substantially encased in a case. A single activation code that allows the multiple transaction cards to be activated may be provided on the carrier card.

The multiple transaction cards may be related in that one of the transactions cards is a parent transaction card, whereas the remaining transaction cards are children of the parent transaction card. Activating the parent transaction card may cause the child transactions cards to be activated. That is, the single activation code that allows multiple transaction cards of a multi-pack package of transaction cards to be activated may be an activation code for the parent transaction card.

Figure 1:
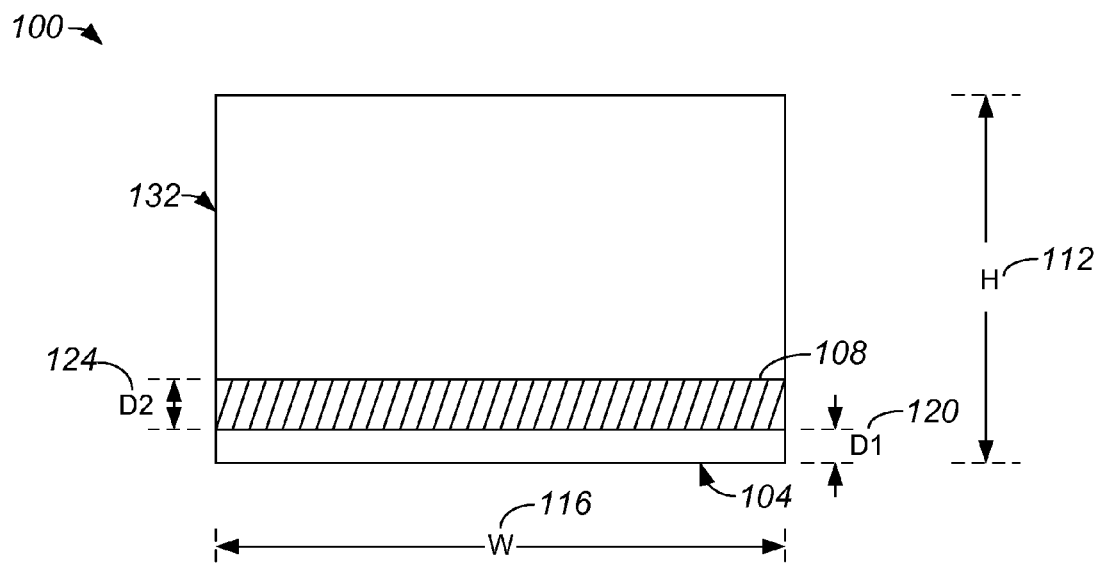
FIG. 1 is a diagrammatic representation of a back surface of a standard CR-80 card.
Figure 2:
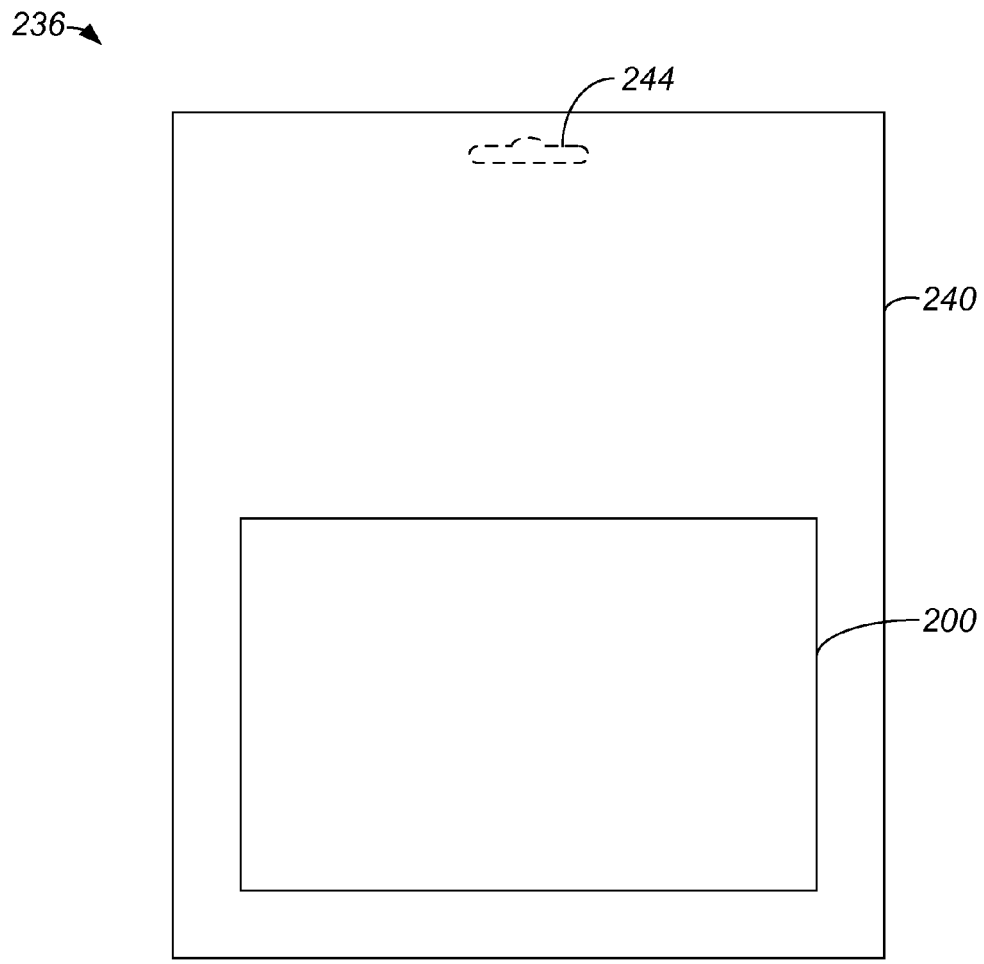
FIG. 2 is a diagrammatic representation of a carrier assembly which includes a standard CR-80 card mounted on a carrier card.
Figure 3A:
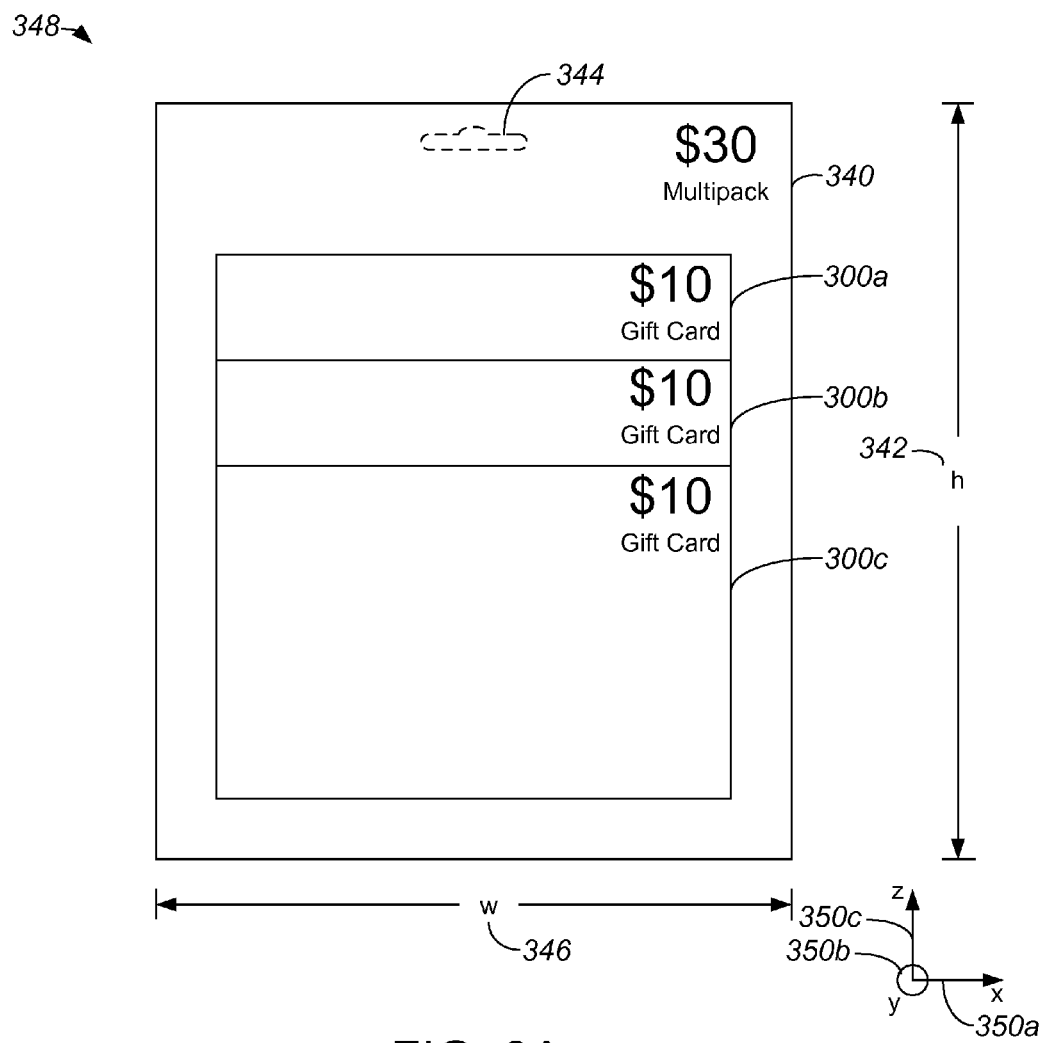
FIG. 3A is a diagrammatic front-view representation of a first multi-pack carrier assembly which includes multiple transaction cards in accordance with an embodiment of the present invention

With reference to FIG. 3A, a front-view representation of a carrier assembly which includes multiple transaction cards, i.e., a multi-pack carrier assembly, will be described in accordance with a first embodiment of the present invention. A carrier assembly 348 includes a carrier card or card holder 340 on which a plurality of separate transaction cards 300a-c are mounted. Carrier card 340, which may be formed from a material such as paper, cardstock, plastic, petroleum-based materials, or corn-based materials. The carrier card 340 may also include printing so as to display information, such as for example to display a cost or a value of carrier assembly 348. Carrier card 340 may include an opening 344, e.g., a sombrero-shaped opening, which enables carrier card 340 to be displayed on and/or supported on a hanging rack.

A front surface of carrier card 340 supports transaction cards 300a-c. Transaction cards 300a-c may be a standard CR-80 size, although it should be appreciated that transaction cards 300a-c may be any suitable size. In other words, transaction cards 300a-c are not limited to being a standard credit card size. Further, transaction cards 300a-c may be formed from any suitable material. Suitable materials from which transaction cards 300a-c may be formed include, but are not limited to including, plastic, paper, cardstock, petroleum-based materials, and corn-based materials.

The size of carrier card 340 may vary widely. That is, a height h 342 relative to a z-direction 350c and a width w 346 relative to an x-direction 350a of carrier card 340 may be widely varied. By way of example, height h 342 may be approximately 5.25 inches and width w 346 may be approximately four inches. As will be appreciated by those in the art, a thickness (not shown) relative to a y-direction 350b of carrier card 340 may also vary. In general, height h 342 and width w 346 may be such that carrier card 340 is substantially the same size as a standard carrier card (not shown), e.g., a carrier card (not shown) that supports only a single transaction card.

Substantially any number of transaction cards 300a-c may be mounted on the front surface of carrier card 340. As shown, three transaction cards 300a-c are mounted on carrier card 340 in a "fanned" pattern such that at least a portion of each transaction card 300a-c is visible. By way of example, a portion of each transaction card 300a-c which shows a value associated with each transaction card 300a-c may be visible. The fanned pattern may be such that a front surface of a transaction card 300c is substantially entirely visible, while some portions of underlying transaction cards 300a, 300b are visible.

Figure 3B:
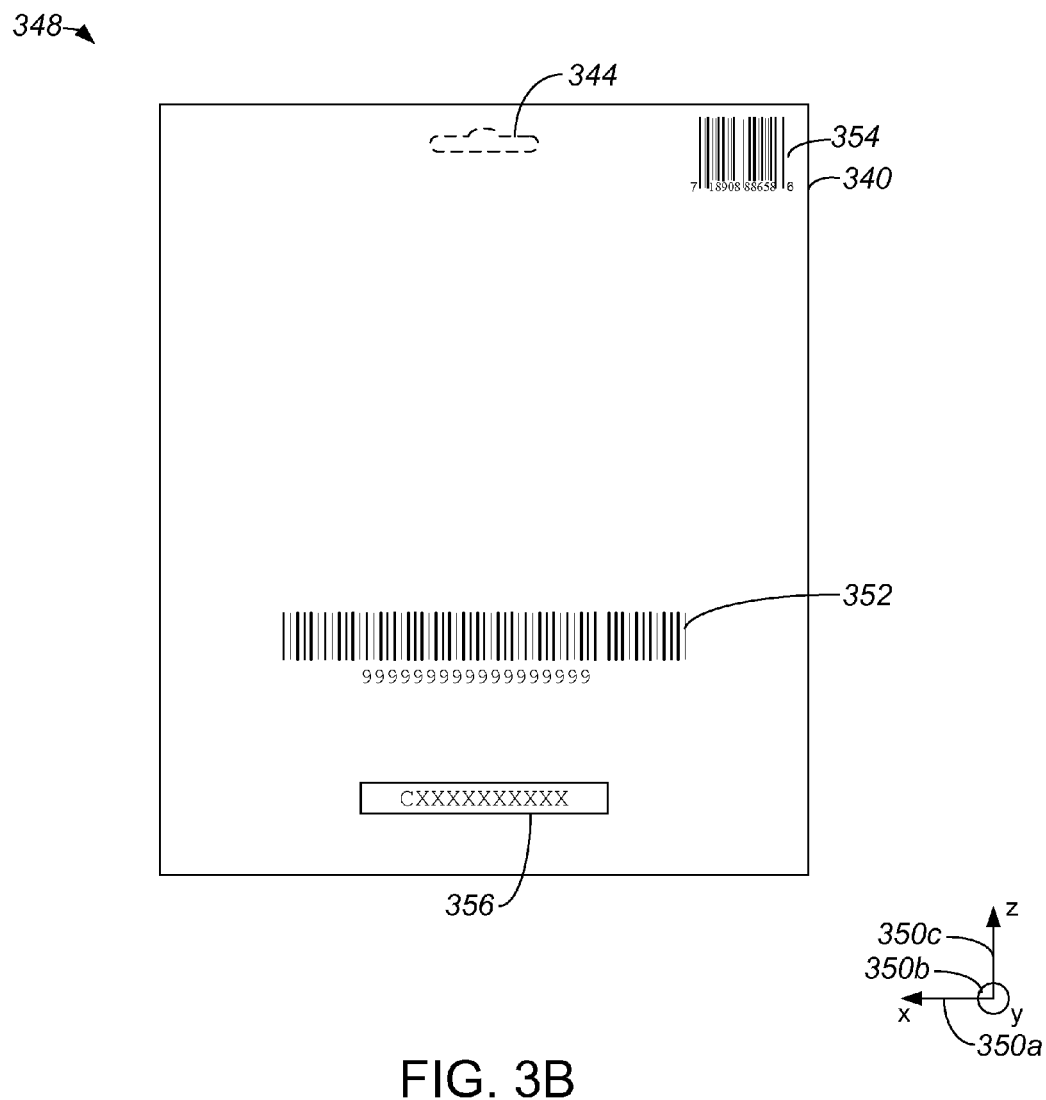
FIG. 3B is a diagrammatic back-view representation of a first multi-pack carrier assembly, e.g., multi-pack carrier assembly 348 of FIG. 3A, in accordance with an embodiment of the present invention.

FIG. 3B is a diagrammatic back-view representation of carrier assembly 348. A back surface of carrier card 340 includes a bar code 352 which may be scanned or otherwise read to activate and to authenticate transaction cards 300a-c. Hence, transaction cards 300a may all be activated and authenticated by causing information associated with bar code 352 to be obtained and then transmitted to an authentication and activation server. In one embodiment, back surface of carrier card 340 also includes a UPC code 354 that may also be arranged to be scanned for various purposes, including inventory management or activation/authentication of transaction cards 300a-c.

Bar code 352 may be specially generated for the purpose of activating transaction cards 300a-c at substantially the same time. It should be appreciated, however, that bar code 352 may instead be an activation code that is associated with transaction card 300c. For example, if transaction card 300c is a parent transaction card and transaction cards 300a, 300b are child transaction cards relative to the parent transaction card, the activation code associated with transaction card 300c may be such that in addition to activating transaction card 300c, the activation code also activates transaction cards 300a, 300b.

Back surface of carrier card 340 may include an opening 356 through which identifying information associated with a back surface of transaction card 300c may be shown. The visibility of such information may allow the actual transaction cards 300a-c associated with carrier assembly 348 to be readily identified.

Figure 3C:
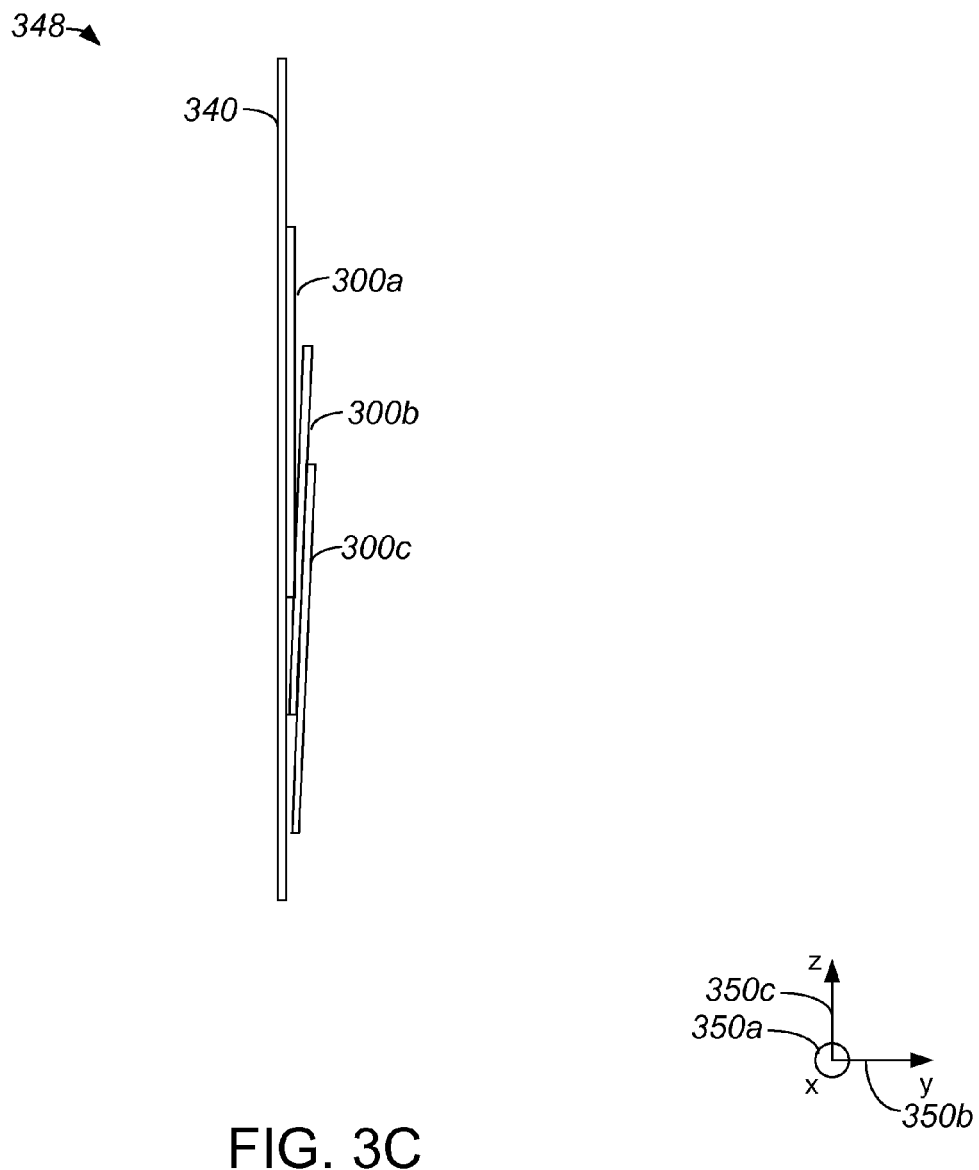
FIG. 3C is a diagrammatic side-view representation of a first multi-pack carrier assembly, e.g., multi-pack carrier assembly 348 of FIG. 3A, in accordance with an embodiment of the present invention.

A side-view of carrier assembly 348 is shown in FIG. 3C. Transaction cards 300a-c are substantially stacked in a fanned pattern. As will be discussed below with reference to FIG. 6, drops or pads of adhesive material may be used to removably secure transaction cards 300a-c individually to carrier card 340.

Figure 3D:
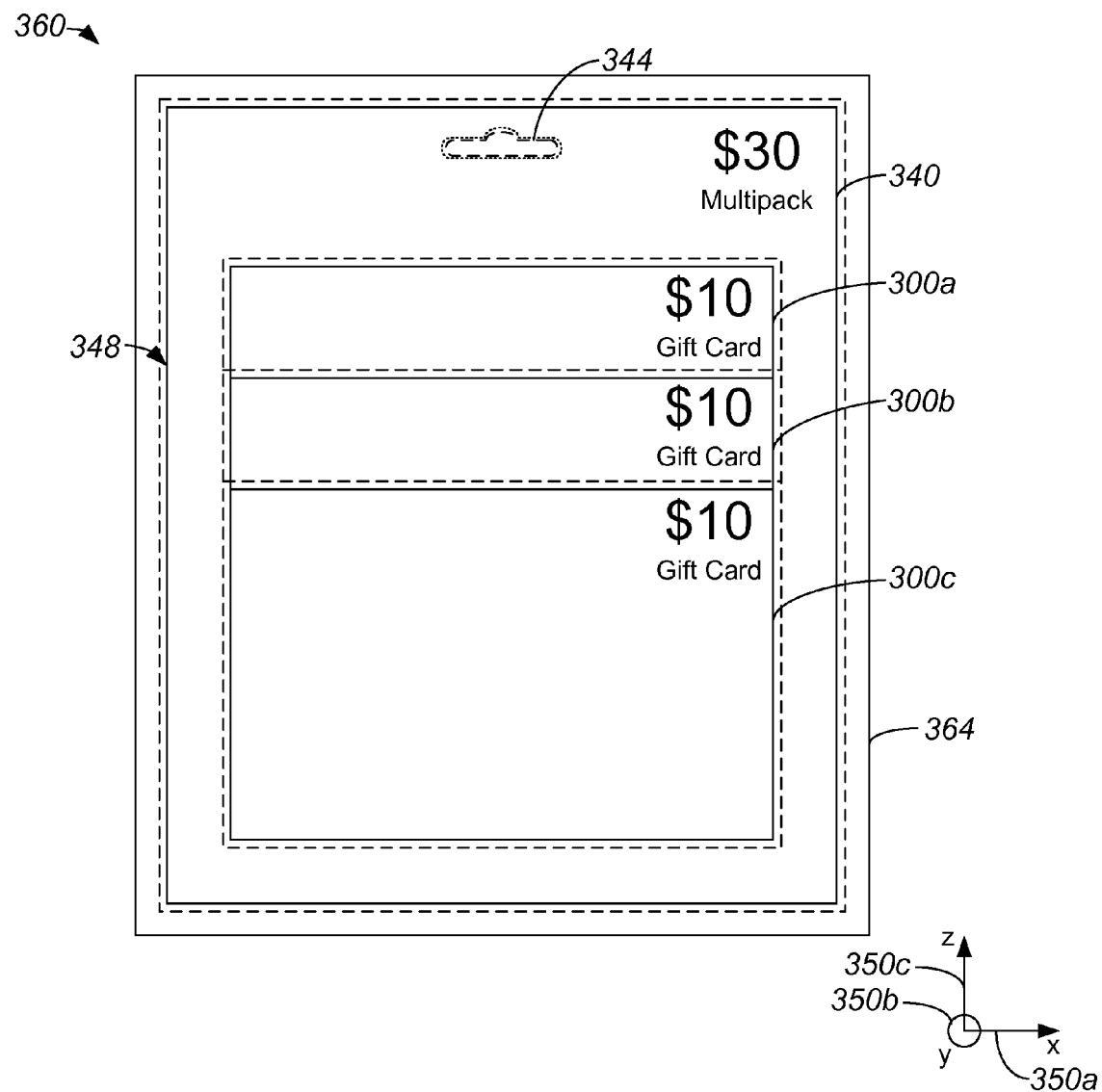
FIG. 3D is a diagrammatic front-view representation of an overall multi-pack package that includes a first multi-pack carrier assembly, e.g., multi-pack carrier assembly 348 of FIG. 3A, in accordance with an embodiment of the present invention.
Figure 3E:
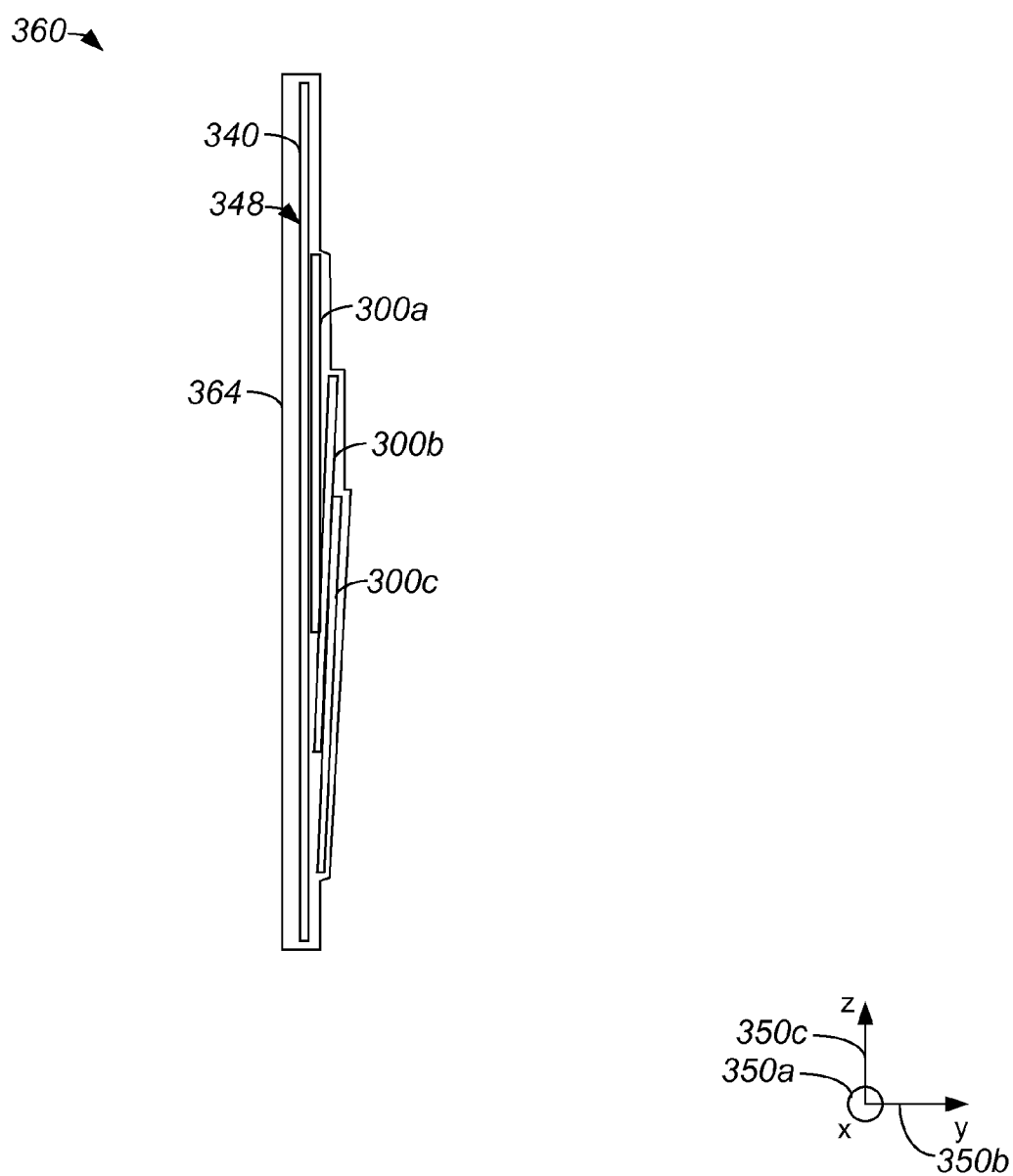
FIG. 3E is a diagrammatic side-view representation of an overall multi-pack package, e.g., overall multi-pack package 360 of FIG. 3D, in accordance with an embodiment of the present invention.

In one embodiment, carrier assembly 348 may be placed in a case, e.g., a plastic case, to form an overall multi-pack package. In one embodiment, the case is clear so as to be highly translucent. The use of a plastic case may protect transaction cards 300a-c and carrier card 340 from wear and tear. FIG. 3D is a diagrammatic front-view representation of an overall multi-pack package that includes carrier assembly 348 and a case, and FIG. 3E is a diagrammatic side-view representation of the overall multi-pack package, in accordance with an embodiment of the present invention. An overall multi-pack package 360 includes a case 364 which contains carrier assembly 340. Case 364 may be molded or otherwise shaped to accommodate carrier card 340 and transaction cards 300a-c. As shown, a portion of case 364 which is arranged to cover transaction cards 300a-c can be effectively contoured to fit over transaction cards 300a-c.

Case 364 may be formed from substantially any material which enables transaction cards 300a-d and carrier card 340 to be viewed through case 364. One suitable material, as previously mentioned, is plastic, although case 364 is not limited to being formed from plastic. Case 364 may be formed as a single piece that is arranged to fold together around carrier assembly 348. By way of example, case 364 may be formed as a single piece which effectively has a hinge or pivot arrangement (not shown) that allows case 364 to substantially pivot from an open position into a closed position, as shown. That is, case 364 may be of a clamshell configuration. One implementation of a clamshell configuration for a case will be described below with respect to FIGS. 5A and 5B.

Figure 3F:
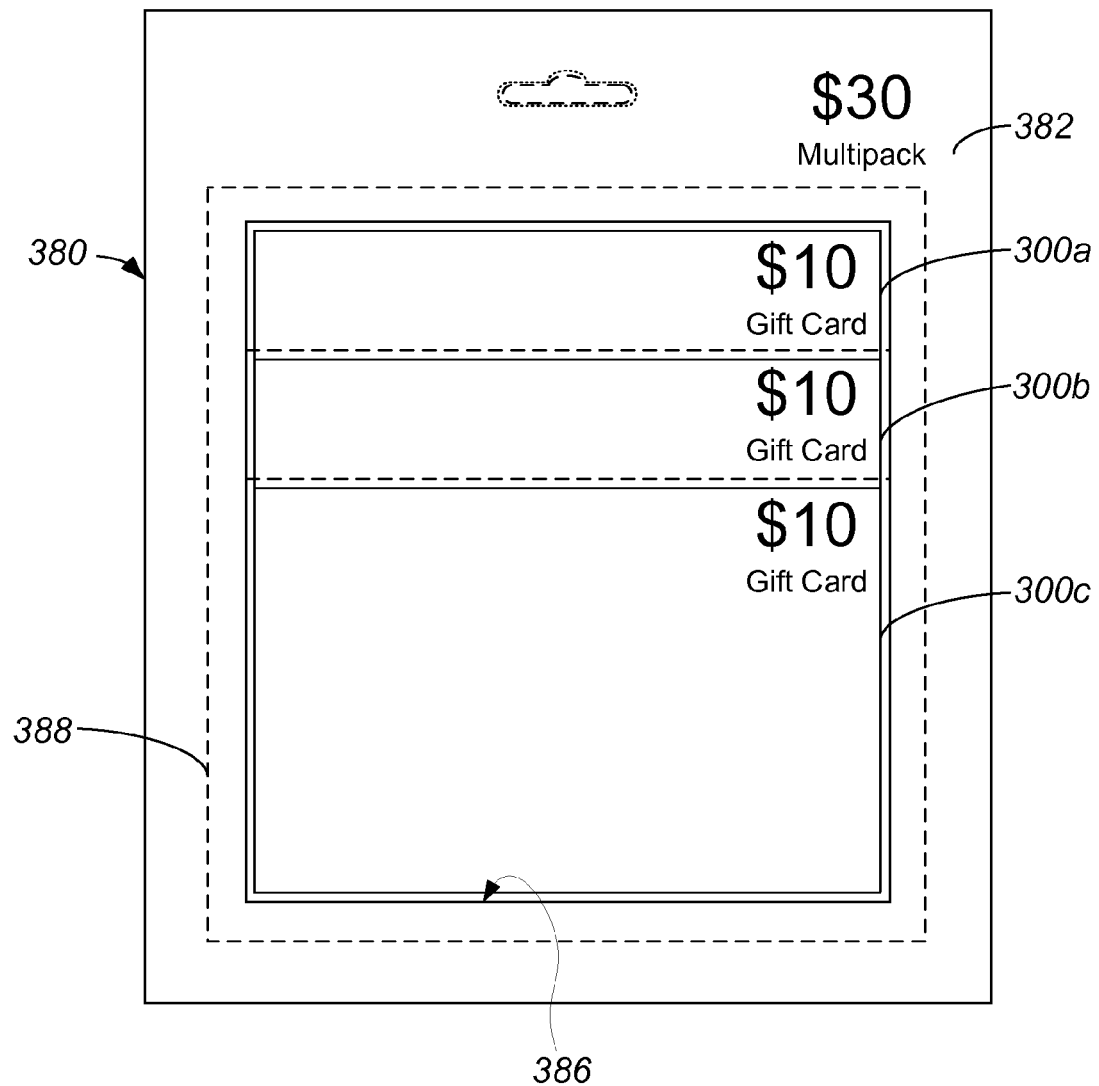
FIG. 3F is a diagrammatic front-view representation of a multi-pack package formed from a carrier assembly in accordance with another embodiment of the present invention.
Figure 3G:
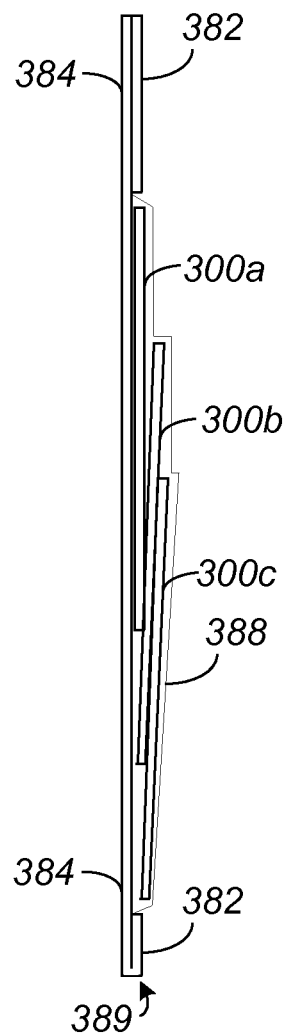
FIG. 3G is a diagrammatic side-view representation of a multi-pack package formed from a carrier assembly, e.g., carrier assembly 380 of FIG. 3F, in accordance with another embodiment of the present invention.

In another embodiment, a carrier assembly can form a multi-pack package. FIG. 3F is a diagrammatic front-view representation of a multi-pack package formed from a carrier assembly 380, and FIG. 3G is a diagrammatic side-view representation of the carrier assembly 380, in accordance with another embodiment of the present invention.

In one embodiment, the carrier assembly 380 can have a separate front layer 382 and a back layer 384. The layers can be joined by adhesive and/or can be integrally formed. Like the carrier card 340 discussed above, the carrier assembly 380 may be formed from a material such as paper, cardstock, plastic, petroleum-based materials, or corn-based materials. Further, the front layer 382 of the carrier assembly 380 has an opening 386 that receives an insert 388. In one embodiment, insert 388 is clear so as to be highly translucent. For example, insert 388 can be plastic. The use of plastic for insert 388 is able to protect transaction cards 300a-c from wear and tear. The insert 388 may be molded or otherwise shaped to accommodate transaction cards 300a-c. As shown, the insert 388 which is arranged to cover transaction cards 300a-c may be effectively contoured to fit over transaction cards 300a-c.

In the case where the layers are integrally formed, the paper card is arranged to fold together around transaction cards 300a-c. By way of example, the paper card may be formed as a single piece which effectively has a hinge or pivot arrangement end 389 that allows the carrier assembly 380 to substantially pivot from an open position into a closed position, as shown. That is, the carrier assembly 380 may be of a clamshell configuration. One implementation of a clamshell configuration for a case will be described below with respect to FIGS. 5A and 5B.

Figure 3H:
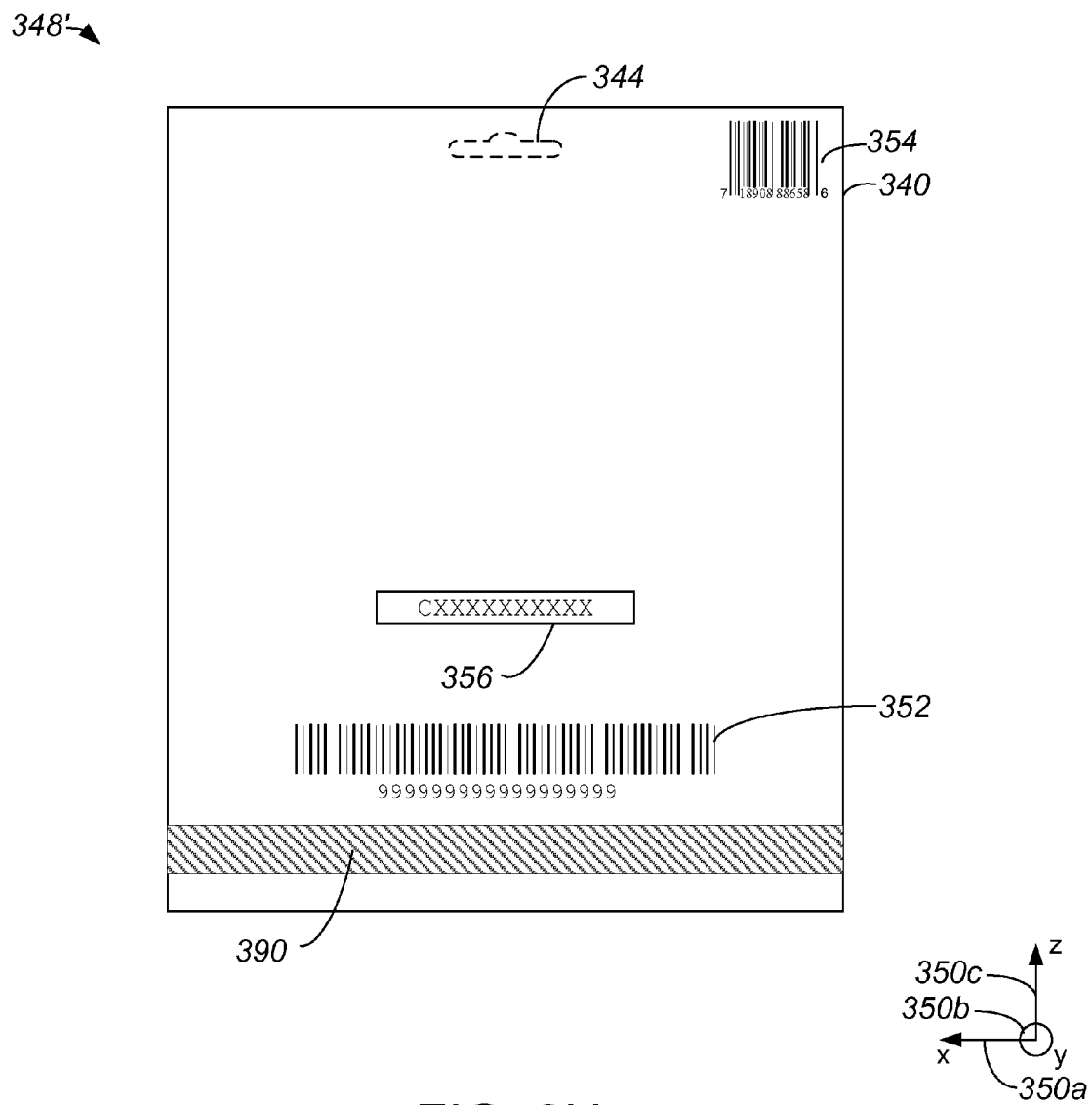
FIG. 3H is a diagrammatic back-view representation of a carrier assembly according to another embodiment.

FIG. 3H is a diagrammatic back-view representation of carrier assembly 348' or carrier assembly 380' according to another embodiment. The back surface of carrier card 340 may be generally similar to the back surface of the carrier card 340 illustrated in FIG. 3B or the back surface of the carrier assembly 380'. In this embodiment, the back surface of carrier card 340 or the carrier assembly 380' includes a magnetic stripe 390 that can be read by a reader device to activate and to authenticate transaction cards 300a-c.

Figure 4:
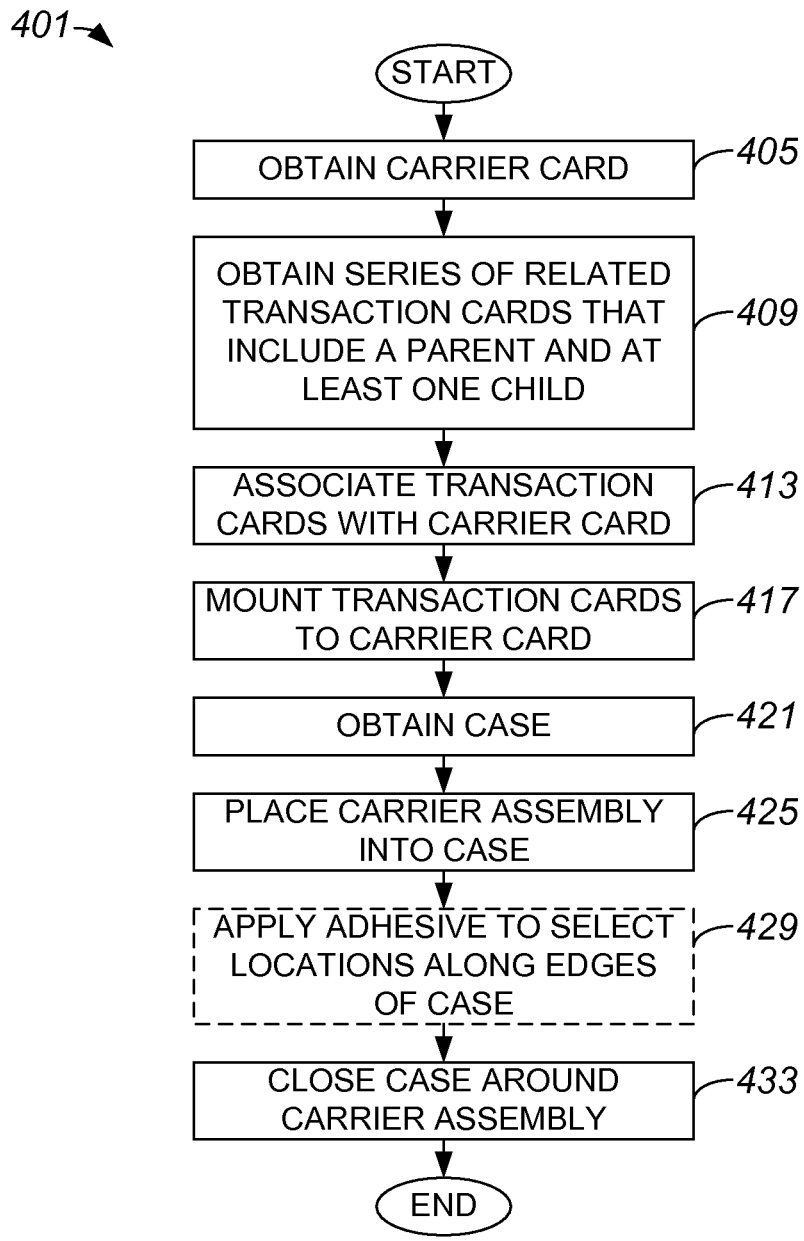
FIG. 4 is a process flow diagram which illustrates a method of assembling an overall multi-pack package in accordance with an embodiment of the present invention.

With reference to FIG. 4, a method of assembling an overall multi-pack package, such as overall multi-pack package 360, will be described in accordance with an embodiment of the present invention. A process 401 of assembling an overall multi-pack package begins at step 405 in which a carrier card is obtained. Once the carrier card is obtained, a series of related transaction cards that include a parent and at least one child are obtained in step 409. Transaction cards that are related may have consecutive identifying numbers, or may include similar identifying numbers, e.g., a first transaction card may be identified by a sequence with a first prefix and a second transaction card may be identified by the same sequence with a second prefix. A child transaction card may be related to a parent transaction card such that upon activation of the parent transaction card, the child transaction card is also activated.

The transaction cards are associated with the carrier card in step 413. Associating the transaction cards with the carrier card may include, but is not limited to including, creating a bar code and/or magnetic stripe that identifies the transaction cards and is arranged to activate the transactions card, as well as providing the bar code or magnetic stripe onto a surface (e.g., back surface) of the carrier card. In one embodiment, a bar code that provides data used to activate the transaction cards. In another embodiment, a magnetic strip is provided on the carrier card to provide data used to activate the transaction cards.

After the transaction cards are associated with the carrier card, the transaction cards are mounted to the carrier card in step 417 to form a carrier assembly. Mounting the transaction cards to the carrier card may include applying adhesive to couple each transaction card to the carrier card in a fanned pattern, as will be discussed below with respect to FIG. 6. It should be appreciated that mounting the transaction cards may also include aligning the transaction cards in predetermined positions. By way of example, if the carrier card includes an opening through which an identifying number on one of the transaction cards is to be displayed, mounting the transaction cards may include ensuring that the identifying number is positioned such that it may be viewed through the opening.

From step 417, process flow moves to step 421 in which a case is obtained. The case is configured for the carrier assembly to fit therein. The carrier assembly is placed into or otherwise situated in the case in step 425. Placing the carrier assembly into the case generally includes ensuring that the transaction cards of the carrier assembly effectively fit into any appropriate indentations formed in the case.

Once the carrier assembly is placed into the case, adhesive may be optionally applied to select locations along the edges of the case in step 429. In one embodiment, "spots" of adhesive may be applied in several locations along the edges of the case to decrease the likelihood that, when closed, the case may be accidentally opened. The use of adhesive may also serve to indicate if a closed case has been opened, as a purchaser may be able to see that a bond formed from the adhesive has been compromised.

In step 433, the case is closed around the carrier assembly. If the case is a clamshell case, the halves of the case may be substantially interlocked together. After the case is closed around the carrier assembly, the process of assembling an overall multi-pack package is completed.

Figure 5A:
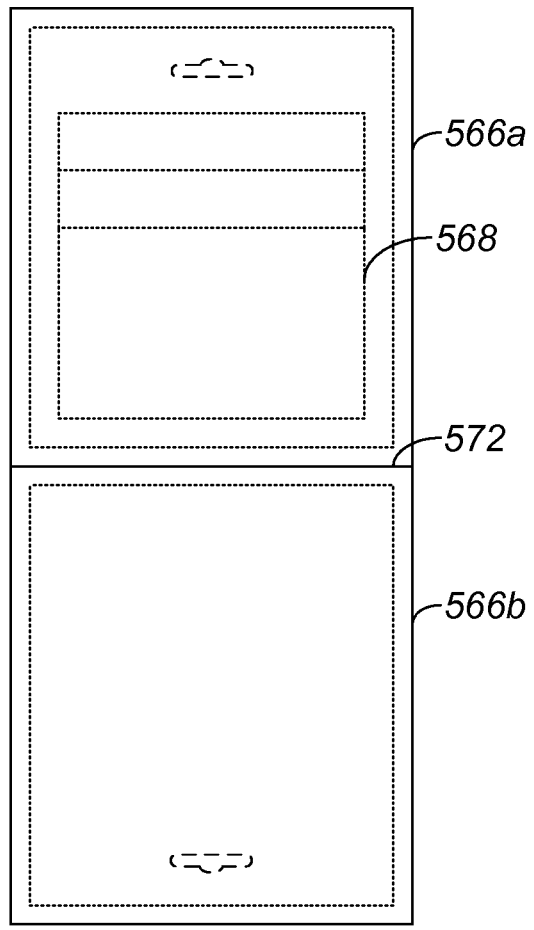
FIG. 5A is a diagrammatic front-view representation of an open case in accordance with an embodiment of the present invention.
Figure 5A:
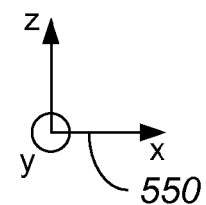
Figure 5B:
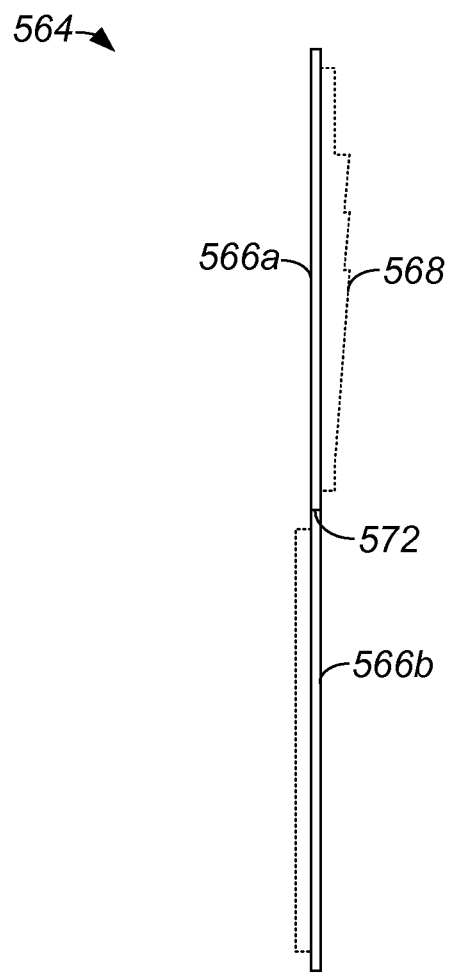
FIG. 5B is a diagrammatic side-view representation of an open case, e.g., open case 564 of FIG. 5A, in accordance with an embodiment of the present invention.
Figure 5B:
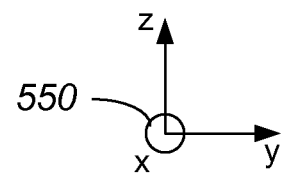

As previously mentioned, a case that is a part of an overall multi-pack package may be a clamshell case. Referring next to FIGS. 5A and 5B, a clamshell case will be described in accordance with an embodiment of the present invention. The clamshell case can represent one embodiment of the case 364 of the overall multi-pack package 360. FIG. 5A is a diagrammatic front-view representation of an open case, while FIG. 5B is a diagrammatic side-view representation of the open case. A clamshell case 564 includes two halves 566a, 566b which are substantially separated by a hinge or a seam 572. Hinge 572 may effectively be a crease formed in clamshell case 564 that enables half 566a to be rotated relative to half 566b, or vice versa, about an x-axis 550. Half 566a includes raised areas 568 that are sized to accommodate transaction cards (not shown) therein.

Figure 6:
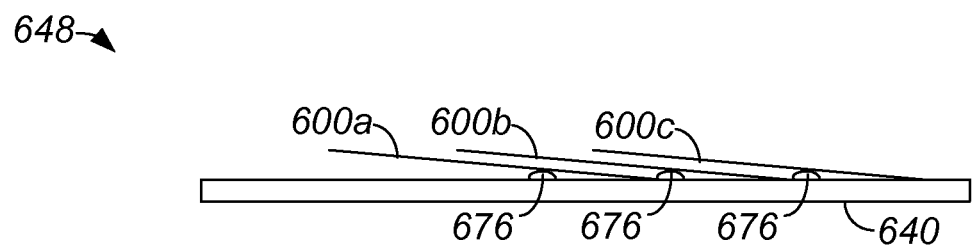
FIG. 6 is a diagrammatic side-view representation of a multi-pack carrier assembly in which transaction cards are coupled to a carrier using adhesive in accordance with an embodiment of the present invention.

Transaction cards may be mounted on a carrier card using adhesive. FIG. 6 is a diagrammatic side-view representation of a carrier assembly in which transaction cards are coupled to a carrier card using adhesive in accordance with an embodiment of the present invention. A carrier assembly 648 includes a carrier card 640 and multiple transaction cards 600a-c which are substantially supported on carrier card 640 in a fanned pattern. To secure or otherwise hold each transaction card 600a-c to carrier card 640, i.e., to mount each transaction card 600a-c onto carrier card 640, adhesive 676 may be used. Such adhesive 676, which may be applied at various locations along backs of transaction cards 600a-c, may be strong enough to hold transaction cards 600a-c on carrier card 640, but may still enable transaction cards 600a to be readily detached from carrier card 640. Although adhesive 676 has been described as being positioned to enable transaction cards 600a-c to each be substantially directly bonded to carrier card 640, adhesive 676 may instead, or additionally, be positioned to enable transaction card 600a-c to bond to each other, e.g., transaction card 600b may be bonded to transaction card 600a rather than to carrier card 640.

Figure 7:
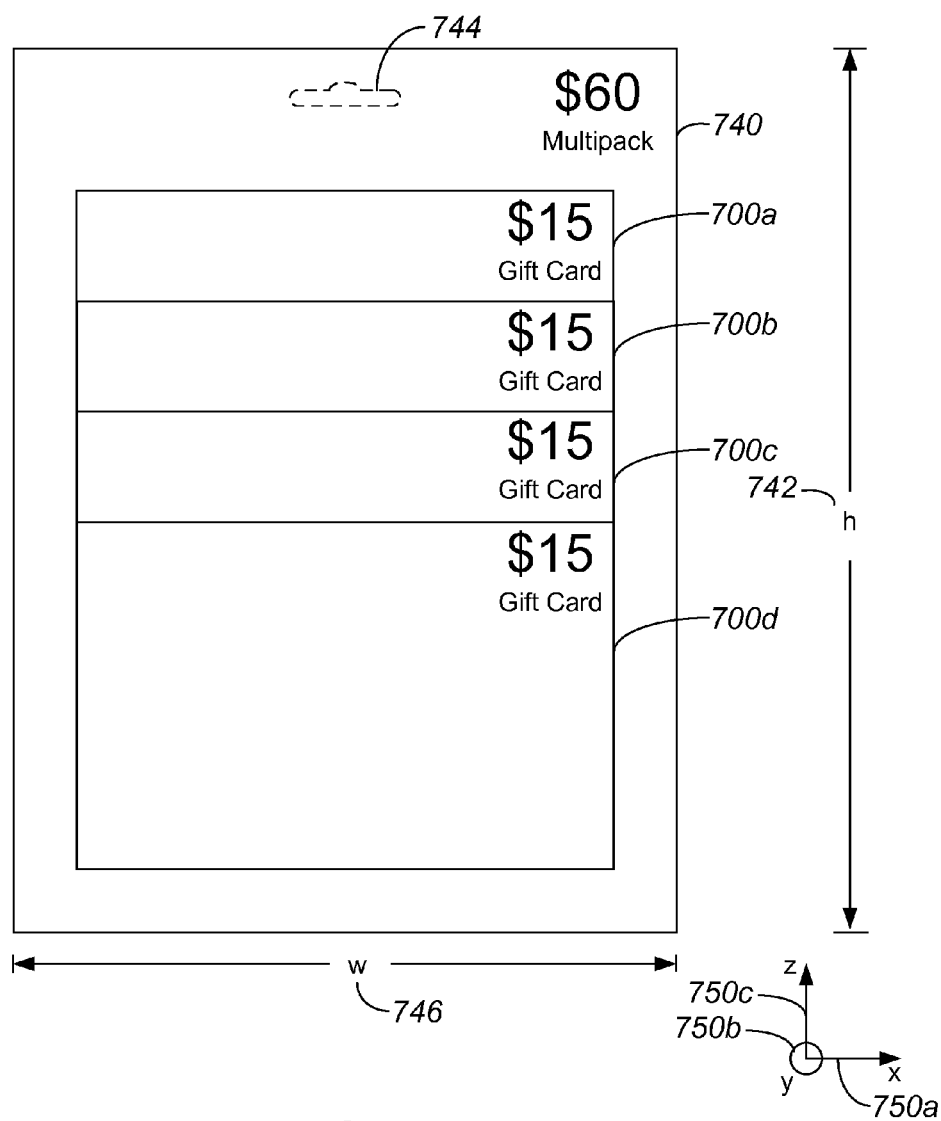
FIG. 7 is a diagrammatic front-view representation of a second multi-pack carrier assembly which includes multiple transaction cards in accordance with an embodiment of the present invention.

In general, the size of a carrier assembly and/or the number of transaction cards included in a carrier assembly may vary widely. FIG. 7 is a diagrammatic front-view representation of a carrier assembly which includes multiple transaction cards in accordance with a second embodiment of the present invention. A carrier assembly 748 includes a carrier card 740 on which four transaction cards 400a-d are mounted. Carrier card 740 includes an opening 744 which enables carrier card 340 to be displayed on and/or supported on a hanging rack.

Transaction cards 400a-d may typically be a standard CR-80 size, although the size of transaction cards 400a-d is not limited to being a standard CR-80 size. The size of carrier card 740 may vary widely. By way of example, a height h 742 relative to a z-direction 750c and a width w 746 relative to an x-direction 750a of carrier card 740 may be widely varied. It should be appreciated that, a thickness (not shown) relative to a y-direction 750b of carrier card 740 may also vary.

In one embodiment, height h 742 may be approximately 5.25 inches and width w 746 may be approximately four inches, although height h 742 may be greater than approximately 5.25 inches. Generally, height h 742 may be increased as appropriate to accommodate additional transaction cards 700a-d. For instance, height h 742 of carrier card 740 may be greater than height h 342 of carrier card 340 of FIG. 3A, as carrier card 740 holds more transaction cards 700a-d than held by carrier card 340, e.g., height h 742 may be approximately six inches.

Figure 8:
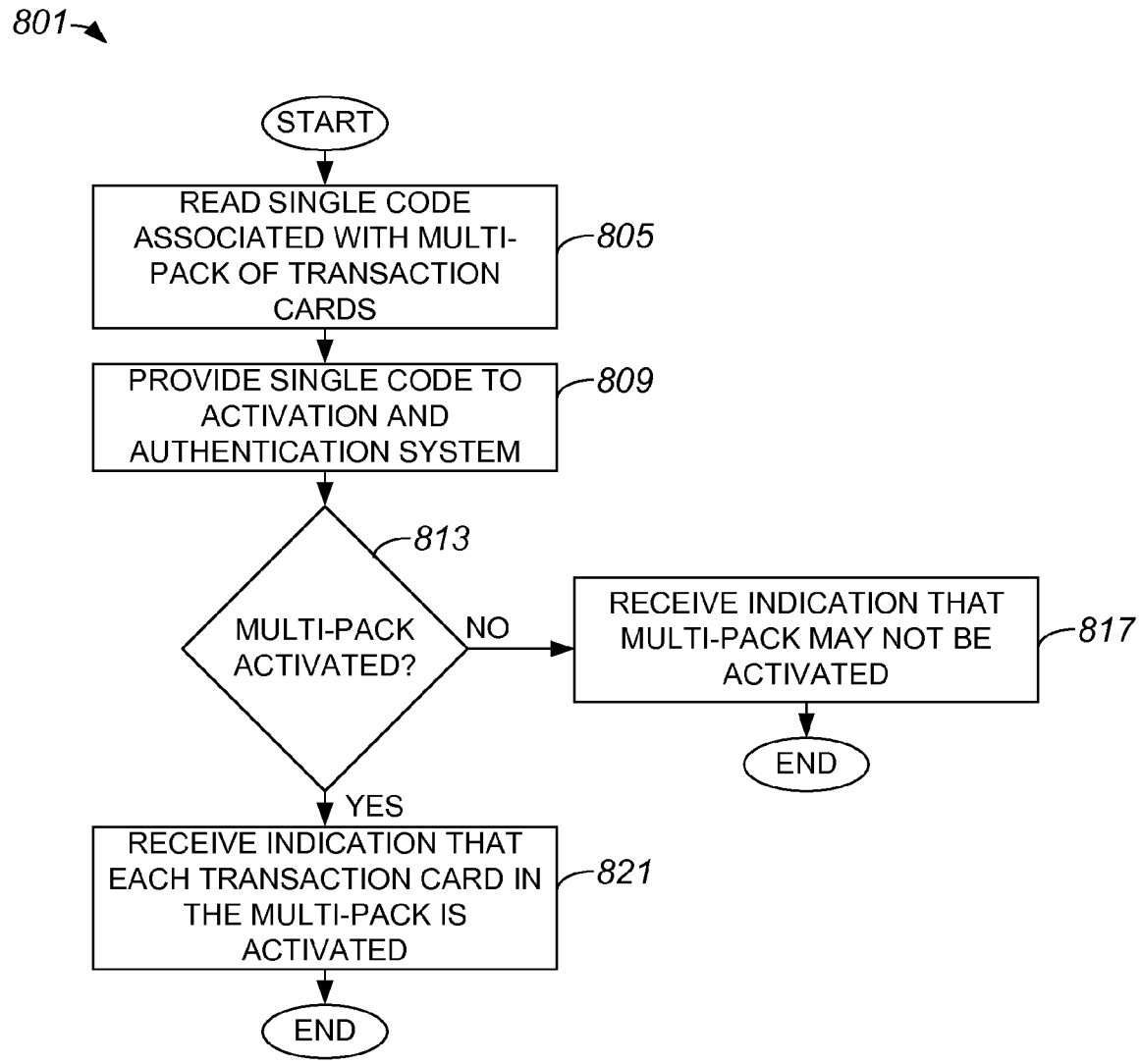
FIG. 8 is a process flow diagram which illustrates a method of activating a multi-pack of transaction cards in accordance with an embodiment of the present invention.

As mentioned above, the transaction cards associated with a multi-pack package may be activated substantially simultaneously when the package is effectively activated. FIG. 8 is a process flow diagram which illustrates a method of activating a multi-pack of transaction cards in accordance with an embodiment of the present invention. A process 801 of activating a multi-pack of transaction cards begins at step 805 in which a single code, e.g., an activation code, associated with a multi-pack of transaction cards is read. A multi-pack of transaction cards may be scanned or otherwise read at a point-of-sale in order to obtain information associated with the transaction cards. The single code may be provided as a bar code that is present on a surface of a carrier card, although the single code is not limited to being provided by a bar code. For example, the single code could alternatively be provided by a magnetic stripe.

After the single code is scanned, the single code is provided in step 809 from the point-of-sale to an activation and authentication system. That is, information that is obtained from the single code is sent or otherwise transmitted to the activation and authentication system such that the activation and authentication system may activate the transaction cards.

A determination is made in step 813 as to whether the activation and authentication system has activated the multi-pack. Such a determination may include determining if each transaction card included in the multi-pack has been successfully activated. If it is determined that the multi-pack is not activated, then process flow proceeds to step 817 in which an indication is received that the transaction cards in the multi-pack may not be activated. Once the indication that the transaction cards may not be activated is received, the process of activating the multi-pack is completed.

Alternatively, if it is determined in step 813 that the multi-pack is activated, the indication is that each transaction card included in the multi-pack has been activated. Accordingly, in step 821, an indication is received which indicates that each transaction card in the multi-pack is activated. That is, the indication may indicate that each transaction card has been transitioned from an unactivated state to an activated state using the single code. The process of activating the multi-pack is completed upon receipt of the indication that each transaction card in the multi-pack is activated.

Figure 9:
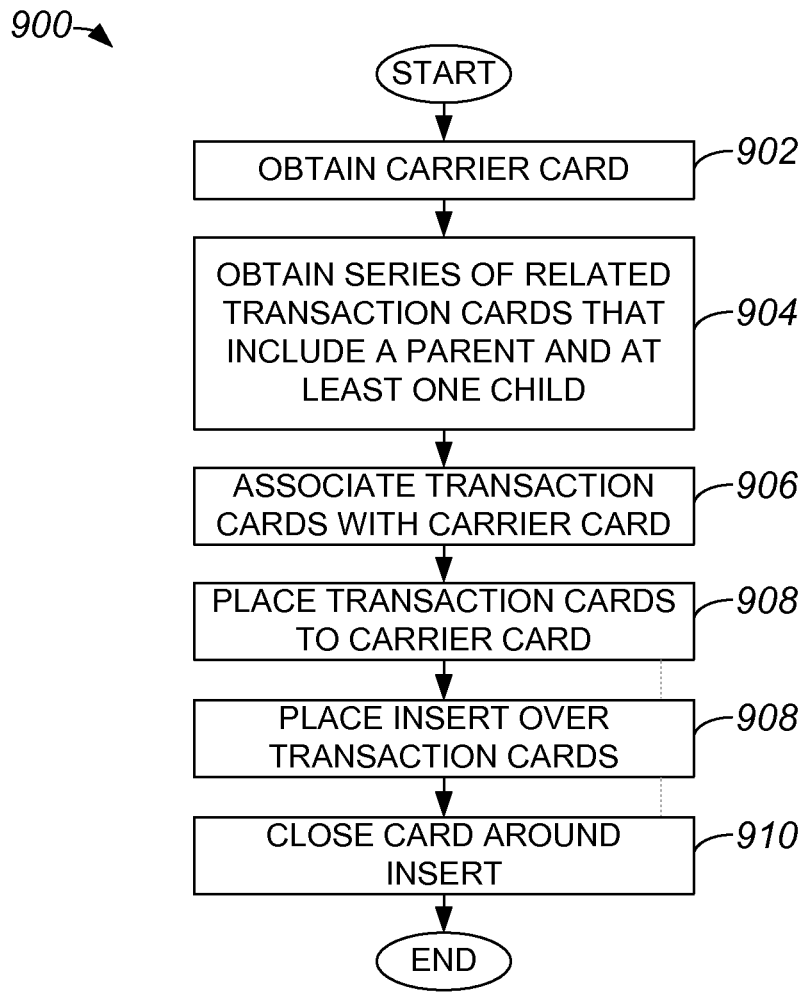
FIG. 9 is a process flow diagram which illustrates a method of assembling an overall multi-pack package in accordance with another embodiment of the present invention.

With reference to FIG. 9, a method of assembling a multi-pack package, such as multi-pack package 380, will be described in accordance with an embodiment of the present invention. A process 900 of assembling an overall multi-pack package begins at step 902 in which a carrier card is obtained. Once the carrier card is obtained, a series of related transaction cards that include a parent and at least one child are obtained in step 904. Transaction cards that are related may have consecutive identifying numbers, or may include similar identifying numbers, e.g., a first transaction card may be identified by a sequence with a first prefix and a second transaction card may be identified by the same sequence with a second prefix. A child transaction card may be related to a parent transaction card such that upon activation of the parent transaction card, the child transaction card is also activated.

The transaction cards are associated with the carrier card in step 906. Associating the transaction cards with the carrier card may include, but is not limited to including, creating a bar code and/or magnetic stripe that identifies the transaction cards and is arranged to activate the transactions card, as well as providing the bar code or magnetic stripe onto a surface (e.g., back surface) of the carrier card. In one embodiment, a bar code that provides data used to activate the transaction cards. In another embodiment, a magnetic strip is provided on the carrier card to provide data used to activate the transaction cards.

After the transaction cards are associated with the carrier card, the transaction cards are placed on the carrier card in step 908. The transaction cards may be placed in a fanned pattern. It should be appreciated that placing the transaction cards may also include aligning the transaction cards in predetermined positions. By way of example, if the carrier card includes an opening through which an identifying number on one of the transaction cards is to be displayed, mounting the transaction cards may include ensuring that the identifying number is positioned such that it may be viewed through the opening. Adhesive may or may not be used to secure the transaction cards in the predetermined positions.

Next, an insert can be placed 910 over the transaction cards that have been placed 908. In one implementation, the insert can be translucent (e.g., clear plastic). The insert may be contoured to conform to the fanned pattern of the placed transaction cards. The carrier card can then be closed 912 over the insert. In one embodiment, the carrier card has a top surface and a bottom surface. The transaction cards are placed 908 on the bottom surface of the carrier card. The top surface has an opening for receiving the insert. By closing the top surface of the carrier card over the insert and adhering the top surface to the bottom surface, the multi-pack package is formed and secured.

Although only a few embodiments of the present invention have been described, it should be understood that the present invention may be embodied in many other specific forms without departing from the spirit or the scope of the present invention. By way of example, while a clamshell case has been described as being a part of a carrier assembly, a carrier assembly may instead or additionally include shrink-wrap or substantially any other suitable covering that covers at least the transaction cards of a carrier assembly. One suitable alternative to a clamshell case may be a case which includes two pieces that are arranged to interlock or otherwise fit together around a carrier assembly.

In one embodiment, a carrier assembly may be displayed and, hence, sold without being encased in a case or any other covering. That is, a multi-pack of transaction cards may not necessarily be packaged to include a case and may, instead, include substantially only a carrier card and multiple transaction cards mounted thereon.

The use of adhesive at a number of predetermined locations near the edges, e.g., flanges, of a clamshell case has been described as providing a measure of security for a carrier assembly that includes the clamshell case. In one embodiment, adhesive may be applied substantially all along the edges of a clamshell case to effectively seal the clamshell case. Alternatively, the edges of the clamshell case may be heated such that they are essentially melted together to provide a seal.

Adhesive has been described as being suitable for mounting or otherwise securing transaction cards to a surface of a carrier card or card holder. In general, transaction cards may be substantially secured to a carrier card using any suitable method. For example, transaction cards may be secured to a carrier card by inserting transaction cards in slits or cuts that are made in the carrier card.

Displaying transaction cards in a fanned pattern on the surface of a carrier card or card holder allows a purchaser to readily see each transaction card that he or she is purchasing when he purchases a multi-pack of transaction cards. However, transaction cards of a multi-pack are not limited to being displayed in a fanned pattern. For instance, transaction cards may be stacked one on top of the other such that substantially only a front surface of a top transaction card in a stack may be seen.

Any number of transaction cards may be included in a multi-pack of transaction cards. That is, while multi-packs which include three transaction cards or four transaction cards have been described, multi-packs are not limited to including three transaction cards or four transaction cards. Multi-packs may include fewer than three transaction cards or more than four transaction cards.

While a carrier assembly has been described as including more than one of the same transaction card, it should be appreciated that a carrier assembly may include different transaction cards. That is, a multi-pack of transaction cards is not limited to including one version of a transaction card. In one embodiment, the transaction cards included in a multi-pack may be associated with different values or denominations. In another embodiment, the transactions cards included in a multi-pack may be of different designs, e.g., color schemes.

As described above, a carrier card may have an overall activation code printed or otherwise provided thereon which may be used to activate substantially all transaction cards mounted on the carrier card. However, the overall activation code is not limited to being printed on or otherwise provided on the carrier card. For example, the overall activation code may be an activation code associated with a parent transaction card. That is, an activation code associated with a parent transaction card may be configured to activate the parent transaction card as well as associated child transaction cards. Hence, by reading the activation code from a parent transaction card mounted on a carrier card, substantially all the transaction cards mounted on the carrier card may then be activated.

The operations associated with the various methods of the present invention may vary widely. By way of example, steps may be added, removed, altered, combined, and reordered without departing from the spirit or the scope of the present invention.

The many features and advantages of the present invention are apparent from the written description. Further, since numerous modifications and changes will readily occur to those skilled in the art, the invention should not be limited to the exact construction and operation as illustrated and described. Hence, all suitable modifications and equivalents may be resorted to as falling within the scope of the invention.

What is claimed is:

1. A carrier package arrangement comprising:
    a holder having a front surface, a back surface, a first opening, a second opening, a product code displayed on the back surface, and a value presented on the front surface;
    a plurality of transaction cards, the plurality of transaction cards being retained adjacent the front surface of the holder having an identifier visible through the first opening; and
    a molded translucent case having a pivotal bottom end configured to allow the case to move between an open position and a closed position, the case being arranged to contain the entire holder including the first opening and the plurality of transaction cards when in the closed position, wherein the plurality of transaction cards are arranged to be transitioned from an unactivated state to an activated state using a first activation code, the first activation code presented on the back surface of the holder and visible through the molded translucent case, wherein the plurality of transaction cards are arranged such that at least one of the transactions cards is partially overlapped by at least another of the transaction cards in a fanned pattern, wherein the value represents the total cost of the plurality of transaction cards, and wherein the translucent case is previously formed having the fanned pattern and contoured to fit over the at least two transaction cards which are partially overlapped.

2. The carrier package arrangement of claim 1 wherein a bar code is provided on the holder.

3. The carrier package arrangement of claim 2 wherein the first activation code is associated with a magnetic stripe.

4. The carrier package arrangement of claim 1 wherein the second opening allows carrier package to be hung on a display.

5. The carrier package arrangement of claim 4 wherein the case is a clamshell case.

6. The carrier package arrangement of claim 1 wherein the first transaction card and the second transaction card are substantially the same size.

7. The carrier package arrangement of claim 1 wherein the first transaction card and the second transaction card are arranged to have a same value when the first transaction card and the second transaction card are initially placed in the activated state.

8. The carrier package arrangement of claim 1 wherein the first transaction card and the second transaction card are arranged to have different values when the first transaction card and the second transaction card are in the activated state.

9. The carrier package arrangement of claim 1 further including an adhesive material, wherein the first transaction card is substantially directly mounted on the holder with the adhesive material and the second transaction card is substantially directly mounted on the holder with the adhesive material.

10. The carrier package arrangement of claim 1 wherein the holder has a height of approximately 5.25 inches and a width of approximately 4 inches.

11. The carrier package arrangement of claim 1 wherein each transaction card of the plurality of transaction cards is a CR-80 card.

12. The carrier package arrangement of claim 1 wherein the front surface and the back surface of the holder are formed from a single piece of material.

13. The carrier package arrangement of claim 12 wherein the plurality of transaction cards comprise a corn-based material.

14. The carrier package arrangement of claim 1 wherein the plurality of transaction cards includes at least three transaction cards, and wherein the at least three transaction cards are mounted on the front surface of the holder such that at least a portion of at least two of the transaction cards are overlaid by at least a portion of the other transaction cards.

15. The carrier package arrangement of claim 14 wherein the first transaction card and the second transaction card are substantially the same size.

16. The carrier package arrangement of claim 14 wherein the first transaction card and the second transaction card are arranged to have a same value when the first transaction card and the second transaction card are initially placed in the activated state.

17. The carrier package arrangement of claim 14 further including an adhesive material, wherein the first transaction card is substantially directly mounted on the holder with the adhesive material and the second transaction card is substantially directly mounted on the holder with the adhesive material.

18. The carrier package arrangement of claim 14 wherein the holder has a height of approximately 5.25 inches and a width of approximately 4 inches.

19. The carrier package arrangement of claim 14 wherein each transaction card of the plurality of transaction cards is a CR-80 card.

20. The carrier package arrangement of claim 14 wherein a bar code is provided on the holder.

21. The carrier package arrangement of claim 14 wherein the first activation code is associated with a magnetic stripe.

22. The carrier package arrangement of claim 14 wherein the case is a clamshell case.

* * * * *